United States Patent
Kirino

(10) Patent No.: US 10,457,835 B2
(45) Date of Patent: Oct. 29, 2019

(54) COATING AGENT COMPOSITION

(71) Applicant: THREEBOND CO., LTD., Hachioji-shi, Tokyo (JP)

(72) Inventor: Manabu Kirino, Sagamihara (JP)

(73) Assignee: THREEBOND CO., LTD., Hachioji-Shi, Toyko (JP)

(*) Notice: Subject to any disclaimer, the term of this patent is extended or adjusted under 35 U.S.C. 154(b) by 214 days.

(21) Appl. No.: 15/537,670

(22) PCT Filed: Dec. 21, 2015

(86) PCT No.: PCT/JP2015/085710
§ 371 (c)(1),
(2) Date: Jun. 19, 2017

(87) PCT Pub. No.: WO2016/104445
PCT Pub. Date: Jun. 30, 2016

(65) Prior Publication Data
US 2017/0349783 A1 Dec. 7, 2017

(30) Foreign Application Priority Data
Dec. 22, 2014 (JP) .................................. 2014-285232

(51) Int. Cl.
C09D 183/04 (2006.01)
C09K 3/18 (2006.01)

(52) U.S. Cl.
CPC ............. C09D 183/04 (2013.01); C09K 3/18 (2013.01)

(58) Field of Classification Search
CPC ................................................... C09D 183/04
USPC ....................................................... 525/477
See application file for complete search history.

(56) References Cited

U.S. PATENT DOCUMENTS

| | | | |
|---|---|---|---|
| 6,000,339 A | 12/1999 | Matsuzawa | |
| 6,939,925 B2 * | 9/2005 | Sakamoto | C08G 77/44 524/266 |
| 8,298,367 B2 * | 10/2012 | Beger | C08L 83/04 156/325 |
| 2008/0319121 A1 | 12/2008 | Mitani et al. | |
| 2015/0140346 A1 | 5/2015 | Iida et al. | |

FOREIGN PATENT DOCUMENTS

| | | |
|---|---|---|
| JP | H10-36771 A | 2/1998 |
| JP | 2006-22277 A | 1/2006 |
| JP | 2006-045507 A | 2/2006 |
| JP | 2007-161989 A | 6/2007 |
| JP | 2008-075021 A | 4/2008 |
| JP | 2008-101041 A | 5/2008 |
| JP | 2010-031074 A | 2/2010 |
| JP | 2013-194058 A | 9/2013 |
| WO | 96/00758 A1 | 11/1996 |
| WO | 2014/17397 A1 | 1/2014 |

OTHER PUBLICATIONS

PCT/ISA/210, "International Search Report for International Application No. PCT/JP2015/085710" dated Feb. 9, 2016.
PCT/ISA/237, "The Written Opinion of the International Searching Authority for International Application No. PCT/2015/085710" dated Feb. 9, 2016.

* cited by examiner

Primary Examiner — Margaret G Moore
(74) Attorney, Agent, or Firm — Manabu Kanesaka

(57) ABSTRACT

A coating agent composition of the present invention has excellent water repellency and water sliding property, as well as favorable application workability, wear resistance, and storage stability. The coating agent composition is particularly useful in forming a thin coating layer for imparting water repellency, water sliding property, gloss, durability, and antifouling properties to a metal surface, a painted surface, or a resin surface of automotive bodies and railroad vehicles, and other similar objects. Specifically, the coating agent composition contained the following (A) to (D): (A) 100 parts by mass of a hydrolyzable silicone resin; (B) 0.1 to 50 parts by mass of a curing catalyst; (C) 100 to 5000 parts by mass of an organic solvent; and (D) 10 to 150 parts by mass of dimethylpolysiloxane having one or more alkoxysilyl groups at both ends of the molecular chain and having a viscosity at 25° C. within a particular range.

17 Claims, No Drawings

COATING AGENT COMPOSITION

RELATED APPLICATIONS

The present application is National Phase of International Application No. PCT/JP2015/085710 filed Dec. 21, 2015, and claims priority from Japanese Application No. 2014-258232, filed Dec. 22, 2014, the disclosure of which is hereby incorporated by reference herein in its entirety.

TECHNICAL FIELD

The present invention relates to a coating agent composition. Particularly, the present invention relates to a coating agent composition capable of forming a thin coating layer for imparting gloss, water repellency, durability, and/or antifouling properties to a metal surface, a painted surface, or a resin surface of automotive bodies and railroad vehicles, and other similar objects.

BACKGROUND ART

Conventionally, for the purposes of protection and aesthetic appearance improvement, solid, semi-solid or liquid coating agent compositions have been applied to painted steel sheets of automobile bodies and other similar objects. As such coating agent compositions, known examples include a composition containing a moisture curable organopolysiloxane, an organic solvent, and a curing catalyst, and further containing a volatile organopolysiloxane oil and volatile dimethylpolysiloxane added thereto (Patent Literature 1), and a composition further containing a high-viscosity silicone rubber added thereto (Patent Literature 2). However, these compositions have difficulty exhibiting the water repellency for a long period because the non-reactive organopolysiloxane oil volatilizes and dissipates over time.

To solve the above problem, various compositions have been proposed each of which contains a moisture curable silicone oligomer, an organic solvent, a curing catalyst, and a silicone oil having a reactive functional group in the molecule. Patent Literature 3 disclose an example using a reactive silicone oil having reactive groups at both ends of the molecular chain, the reactive groups being selected from a carbinol group, a carboxyl group, an amino group, a hydroxyl group (a silanol group), and the like. Moreover, Patent Literatures 4 and 5 disclose examples each using a reactive silicone oil having an alkoxysilyl group at one end of the molecular chain. Further, Patent Literature 6 proposes an example using a reactive silicone oil having a carbinol group and/or an amino group at a side chain(s) of the molecule. Patent Literature 7 proposes an example containing a fluorine-containing alkoxysilane.

CITATION LIST

Patent Literatures

Patent Literature 1: Japanese Patent Application Publication No. Hei 10-36771
Patent Literature 2: Japanese Patent Application Publication No. 2013-194058
Patent Literature 3: Japanese Patent Application Publication No. 2008-75021
Patent Literature 4: Japanese Patent Application Publication No. 2006-45507
Patent Literature 5: Japanese Patent Application Publication No. 2007-161989
Patent Literature 6: Japanese Patent Application Publication No. 2010-31074
Patent Literature 7: International Publication No. WO1996/000758

SUMMARY OF INVENTION

Technical Problems

However, these compositions each have problems that: the composition storage stability is insufficient, uniform application is difficult, and properties of both water repellency and water sliding property cannot be achieved at the same time.

Solution to Problems

It has been difficult to satisfy desired properties using conventional thin-film coating agent compositions as described above. In the present invention, intensive studies have been conducted to improve these properties. The result has revealed that this object can be achieved by using a coating agent composition having the following constitutions. Specifically, a coating agent composition comprising the following (A) to (D) is used (first aspect):

(A) 100 parts by mass of a hydrolyzable silicone resin relative to which;
(B) 0.1 to 50 parts by mass of a curing catalyst;
(C) 100 to 5000 parts by mass of an organic solvent; and
(D) 10 to 150 parts by mass of dimethylpolysiloxane having one or more alkoxysilyl groups at both ends of the molecular chain, wherein (D) has a viscosity at 25° C. of 100 to 100,000 mPa·s.

Moreover, the present invention also includes the following aspect.

A second aspect relates to the coating agent composition according to the first aspect, wherein the component (A) is a partial hydrolysis condensate of an alkoxysilane compound represented by the following structural formula (1):

$$R^1{}_x\text{—Si(OR}^2)_{4-x} \qquad (1)$$

wherein
$R^1$ and $R^2$ are each independently an optionally substituted aliphatic, alicyclic, or aromatic hydrocarbon group having 1 to 8 carbon atoms, and
x is an integer of 0 to 3.

A third aspect relates to the coating agent composition according to the second aspect, wherein x in the formula (1) of the component (A) comprises 0 or 1.

A fourth aspect relates to the coating agent composition according to any one of the first to third aspects, wherein the component (D) is represented by the following structural formula (2):

$$(R^3O)_a R^4{}_{3-a}\text{SiO—(SiR}^5R^6O)_m\text{—Si(R}^7O)_b R^8{}_{3-b} \qquad (2)$$

wherein
$R^3$ and $R^7$ are each independently an alkyl group having 1 to 3 carbon atoms,
$R^4$ and $R^8$ are each independently a functional group selected from an alkyl group having 1 to 6 carbon atoms, a haloalkyl group having 1 to 6 carbon atoms, and an allyl group having 1 to 6 carbon atoms,
$R^5$ and $R^6$ are each independently an optionally substituted alkyl group having 1 to 4 carbon atoms or an optionally substituted phenyl group,
a and b each independently represent an integer of 1 to 3, and
m represents an integer of 10 to 1500.

A fifth aspect relates to the coating agent composition according to the fourth aspect, wherein, in the component (D) represented by the structural formula (2), a and b are each independently 2 or 3, and $R^3$ and $R^7$ are both methyl groups.

A sixth aspect relates to the coating agent composition according to any one of the first to fifth aspects, wherein the coating agent composition is applied to a steel sheet of an automotive exterior.

A seventh aspect relates to a method for forming a coating layer, comprising:

applying the coating agent composition according to any one of the first to fifth aspects to a substrate surface; and while vaporizing the organic solvent (C), cross-linking reaction components including the components (A) and (D) on the substrate to form a cured coating film.

An eighth aspect relates to a coating layer formed by the method for forming a coating layer according to the seventh aspect.

A ninth aspect relates to the coating layer according to the eighth aspect, wherein a cured film thickness of the coating layer is 0.01 to 100 µm.

The use of the coating agent composition of the present invention makes it possible to provide a thin coating layer which has a favorable operability onto a steel sheet of an automotive exterior and the like, and which is excellent in water repellency and/or water sliding property.

DESCRIPTION OF EMBODIMENTS

Hereinafter, details of the present invention will be described.

A component (A) contained in a coating agent composition of the present invention is a hydrolyzable silicone resin. Herein, the hydrolyzable silicone resin is a silicone compound obtained by subjecting a polyfunctional alkoxysilane compound to partial hydrolysis and dealcoholization condensation (in the present invention, also referred to as partial hydrolysis condensation) with a known catalyst such as an acid, a base, an organotin compound, an organotitanium compound, or the like. The silicone compound has a hydrolyzable group derived from the alkoxysilane compound at an end, a side chain, or the like of the molecular chain, and has a linear or three-dimensional network structure. The compound is typically a partial hydrolysis condensate of an alkoxysilane compound represented by the following structural formula (1):

$$R^1{}_x\text{—Si}(OR^2)_{4-x} \quad (1).$$

Here, $R^1$ and $R^2$ are each independently an optionally substituted aliphatic, alicyclic, or aromatic hydrocarbon group having, for example, 1 to 8 carbon atoms, preferably 1 to 4 carbon atoms, and more preferably 1 to 3 carbon atoms; and x comprises an integer of 0 to 3, favorably including 0 or 1, and particularly favorably including 1. More preferably, x is an integer of any one of 0 to 3, favorably 0 or 1, and particularly favorably 1. Examples of the substituent can include a halogen, a hydroxyl group, an amino group, an imino group, a nitro group, a mercapto group, a vinyl group, a carboxyl group, and the like.

As the method for producing the component (A), the component (A) can be obtained by adding a known hydrolysis catalyst to the compound represented by the structural formula (1), followed by stirring, while heating, the resultant in the presence of water for partial hydrolysis condensation. Examples of the hydrolysis catalyst can include metal salts of organic carboxylic acids such as dibutyltin bistriethoxysilicate, dibutyltin dimethoxide, dibutyltin diacetate, dibutyltin dilaurate, butyltin tri-2-ethylhexoate, lead-2-ethyloctoate, iron-2-ethylhexoate, cobalt-2-ethylhexoate, manganese-2-ethylhexoate, zinc-2-ethylhexoate, tin(II) caprylate, tin naphthenate, tin oleate, tin butyrate, tin naphthenate, zinc naphthenate, cobalt naphthenate, and zinc stearate; organotitanic acid esters such as tetrabutyl titanate, tetra-2-ethylhexyl titanate, triethanolamine titanate, and tetra(isopropenyloxy)titanate; organotitanium compounds such as organosiloxytitanium and β-carbonyltitanium; alkoxyaluminum compounds; quaternary ammonium salts such as benzyltriethylammonium acetate; short-chain fatty acid salts of alkaline metals such as potassium acetate, sodium acetate, and lithium oxalate; dialkylhydroxylamines such as dimethylhydroxyamine and diethylhydroxyamine; and the like. Here, in the case where x is 0 or 1 in the structural formula, when the compound is in the form of a linear polymer, the polymer has an alkoxy group represented by $(OR^2)$ in a side chain; alternatively, the polymer is three-dimensionally cross-linked instead of having the linear structure, so that the polymer partially contains an alkoxy group in the structure. In the compound, although x may be 2 or 3, x is preferably 0 or 1 to effectively add an alkoxy group into the structure of the component (A).

The partial hydrolysis condensate is, for example, a partial hydrolysis condensate containing 2 to 50 alkoxysilane compound molecules as represented by the structural formula (1). A preferable form is a partial hydrolysis condensate of 2 to 30 molecules, a more preferable form is a partial hydrolysis condensate of 2 to 20 molecules, and furthermore preferable form is one or more selected from partial hydrolysis condensates of 2 to 4 molecules, 6 to 10 molecules, and 10 to 20 molecules.

The component (A) is a component exhibiting main water repelling, water sliding, and antifouling functions in the composition. As the compound, commercial products can be used as appropriate, as long as the products correspond to the partial hydrolysis condensate of the compound in the formula (1). Examples thereof can include X-40-9225, X-40-9227, X-40-9246, X-40-9250, KR-500, KC-89S, KR-401N, KR-510, KR-9216, KR-213 (these are products of Shin-Etsu Chemical Co., Ltd.), XC96-B0446, XR31-B1410, XR31-B2733, XR31-B2230, TSR165, XR31-B6667, XR31-B1763 (these are products of Momentive Performance Materials Inc.), SILRES MSE100, SILRES H44 (products of Wacker Asahikasei Silicone Co., Ltd.), and the like. These may be used alone, or several types thereof may be used in combination. In the present invention, favorably, $R^1$ and $R^2$ in the formula are each independently desirably a substituent selected from a methyl group, an ethyl group, a n-propyl group, and an iso-propyl group, and are each particularly favorably a methyl group. As the commercial product, KC-89S, KR-500, X-40-9225, and the like correspond thereto. From the viewpoint of handling during the production, it is preferable use the component (A) having a viscosity at 25° C. of, for example, 0.1 to 1000 mPa·s, preferably 0.5 to 500 mPa·s, and more preferably 1 to 100 mPa·s or so.

A component (B) of the present invention is a curing catalyst and is a compound for reacting the hydrolyzable group (Si—$OR^2$) contained in the component (A) and alkoxysilyl groups (Si—$OR^3$, Si—$OR^7$) contained in a component (D) to be described later with moisture in air and the like for the condensation reaction.

As the component (B), known compounds can be used. It is possible to select and use as appropriate: organometallic compounds such as organotin compounds, organotitanium compounds, organozirconium compounds, and organoaluminum compounds; inorganic acids such as hydrochloric acid and sulfuric acid; organic acids such as p-toluenesulfonic acid and various aliphatic or aromatic carboxylic acids; inorganic bases such as ammonia and sodium hydroxide; organic bases such as tributylamine, 1,5-diazabicyclo[4.3.0]nonene-5 (DBN), 1,8-diazabicyclo[5.4.0]undecene-7 (DBU); and the like. In the present invention, favorably, organometallic compounds selected from organotin compounds, organotitanium compounds, and organoaluminum compounds are desirable. Specific examples thereof include dibutyltin dilaurate, dibutyltin dioctate, dibutyltin diacetate, dioctyltin dilaurate, dioctyltin dioctate, dioctyltin diacetate, dibutyltin bisacetylacetate, dioctyltin bisacetyllaurate, tetrabutyl titanate, tetranonyl titanate, tetrakis ethylene glycol methyl ether titanate, tetrakis ethylene glycol ethyl ether titanate, bis(acetylacetonyl)dipropyl titanate, acetylacetone aluminum, and aluminum trisethylacetoacetate, and the like. These may be used alone, or several types thereof may be used in combination.

The composition amount of the component (B) is within a range of 0.1 to 50 parts by mass, preferably 1 to 35 parts by mass, more preferably 3 to 30 parts by mass, and furthermore preferably 5 to 25 parts by mass, relative to 100 parts by mass of the component (A). With the component (B) in these composition amounts or more, the coating agent composition of the present invention has no curing problem. On the other hand, the component (B) in these composition amounts or less makes the storability at normal temperature (25° C.) favorable.

A component (C) of the present invention is an organic solvent and is an essential component in forming a thin film by uniformly dissolving or diluting the components (A), (B) and the component (D) to be described later. The component (C) is not particularly limited, as long as each of the above-described components can be uniformly dissolved or diluted. From the viewpoint of workability in forming a coating layer by applying the coating agent composition of the present invention, the component (C) is favorably a compound having a high volatility to some extent, preferably having a boiling point of 180° C. or less, or in a case of a mixture, having an initial boiling point of 180° C. or less. Specifically, the component (C) can include acetone, methyl ethyl ketone, methyl acetate, ethyl acetate, propyl acetate, isopropyl acetate, butyl acetate, benzene, toluene, xylene, chlorobenzene, ethyl ether, THF, 1,4-dioxane, methanol, ethanol, 1-propanol, 2-propanol, 1-butanol, 2-butanol, tert-butanol, acetonitrile, n-hexane, n-heptane, cyclohexane, methylcyclohexane, dichloromethane, chloroform, trichlene, tetrachloroethane, gasolines, petroleum ether, naphthene-based petroleum-distilled solvents, paraffin-based petroleum-distilled solvents, isoparaffin-based petroleum-distilled solvents, and the like. These may be used alone, or several types thereof may be used in combination. In the present invention, from the viewpoints of safety and working environment such as odor, particularly favorable are acetic acid ester-based compounds, alcohol-based compounds having 2 or more carbon atoms, ketone-based compounds, saturated aliphatic hydrocarbon compounds, naphthene-based petroleum-distilled solvents, and the like.

The composition amount of the component (C) in the present invention is within a range of 100 to 5000 parts by mass, preferably within a range of 500 to 4000 parts by mass, furthermore preferably within a range of 1000 to 3500 parts by mass, and particularly preferably within a range of 2000 to 3000 parts by mass, relative to 100 parts by mass of the component (A). With the component (C) in these composition amounts or more, the volatility of the coating agent composition of the present invention does not deteriorate. Thereby, the workability during the coating does not decrease, and the coating in the form of thin film is not difficult. On the other hand, the component (C) in these composition amounts or less prevents the solution concentration from becoming too low, so that a uniform coating film can be formed.

A component (D) of the present invention is dimethylpolysiloxane having one or more alkoxysilyl groups at both ends of the molecular chain, and the component has a viscosity at 25° C. within a range of 100 to 100,000 mPa·s. In the coating agent composition of the present invention, when a substrate is coated therewith, this component is cross-linked by a condensation reaction to form a cured coating film, and also exhibits a lubrication action, contributing to an enhancement of the wiping property during dry wiping (workability). In addition, the component has actions on the water repellency and water sliding property after curing. Note that each alkyl group in the alkoxysilyl groups may be an alkyl group having 1 to 3 carbon atoms, preferably an alkyl group having 1 or 2 carbon atoms, and more preferably a methyl group.

As conventionally-used coating agent composition for the water repelling, antifouling, and other properties of steel sheets of automotive exteriors also, dimethylpolysiloxane having an alkoxysilyl group has been used. Nevertheless, such compounds have an alkoxysilyl group at only one end of the molecular chain (Patent Literature 4 and 5); or, in a compound having hydrolyzable groups at both ends of the molecular chain, the hydrolyzable groups are hydroxyl groups (see Patent Literature 3 and Japanese Patent Application Publication No. 2008-138074), for example. Moreover, the flow properties are not specified by viscosity (expressed by N·s/m$^2$=Pa·s in the SI unit system). In contrast to these, the present invention is characterized by using a compound having alkoxysilyl groups at both ends of the molecular chain, the compound having a viscosity at 25° C. within a range of 100 to 100,000 mPa·s. The use of such a material makes it possible to achieve all of durable water repellency and water sliding property as well as excellent operability at the same time, which the conventional coating agent compositions cannot achieve.

A desirable chemical structure of the component (D) in the present invention is represented by the following structural formula (2).

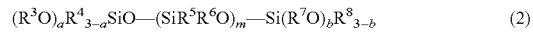

$$(R^3O)_a R^4_{3-a}SiO\text{—}(SiR^5R^6O)_m\text{—}Si(R^7O)_b R^8_{3-b} \qquad (2)$$

Here, $R^3$ and $R^7$ are each independently an alkyl group having 1 to 3 carbon atoms; $R^4$ and $R^8$ are each independently a functional group selected from an alkyl group, a haloalkyl group, and an allyl group all of which have 1 to 6 carbon atoms; $R^5$ and $R^6$ are each independently an optionally substituted alkyl group having 1 to 4 carbon atoms or an optionally substituted phenyl group; a and b are each independently an integer of 1 to 3, preferably 2 or 3; and m represents an integer of 10 to 1500. Examples of the substituent can include a halogen, a hydroxyl group, an amino group, an imino group, a nitro group, a mercapto group, a vinyl group, a carboxyl group, and the like.

As the method for preparing the component (D), the component (D) can be obtained, for example, by a hydrolysis condensation reaction between an organopolysiloxane (silicone oil) having modified hydroxyls at both ends thereof and being represented by HO—(SiR$^5$R$^6$O)$_m$—H with known degree of polymerization or average molecular weight and an alkylalkoxysilane compound having 2 to 4 hydrolyzable groups corresponding to $R^3O$ and $R^7O$ and 0 to 3 alkyl groups corresponding to $R^4$ and $R^8$, provided that a total number of the hydrolyzable groups and the alkyl groups is 4. Here, in a case where the alkylalkoxysilane compound is a compound having two hydrolyzable groups and two alkyl groups, the value of a in the component (D) to be obtained is 1. Meanwhile, in a case where the alkylalkoxysilane compound is a compound having four hydrolyzable groups, the value of a in the component (D) is 3.

More specifically, the component (D) in the present invention can be obtained as appropriate by adding a compound having multiple hydrolyzable silyl groups (such as a polyalkoxysilyl compound) to a dimethyl silicone oil having silanols at ends of the molecular chain, for the reaction therebetween with a hydrolysis reaction catalyst made of an organometallic compound or the like and, if necessary, an acid and so forth. The polyalkoxysilyl compound is preferably methyltrimethoxysilane or the like, the hydrolysis reaction catalyst is preferably dihexylamine or the like, and the acid is preferably 2-ethylhexanoic acid or the like.

The component (D) is more desirably a compound having such a structure that: $R^3$ and $R^7$ at both ends of the molecular chain in the structural formula (2) are each independently any alkyl group selected from a methyl group and an ethyl group; $R^4$ and $R^8$ are each independently any alkyl group selected from a methyl group, an ethyl group, a n-propyl group, and an iso-propyl group; $R^5$ and $R^6$ are each independently any hydrocarbon group selected from a methyl group, an ethyl group, and a phenyl group; a and b are each independently an integer of 2 or 3; and m is within a range of 25 to 1250. In addition, the viscosity is desirably within a range of 100 to 100,000 mPa·s, more favorably within a range of 250 to 50,000 mPa·s, and furthermore favorably 500 to 30,000 mPa·s. When the viscosity is 100 mPa·s or more, the water repellency of the coating layer does not deteriorate. On the other hand, when the viscosity is 100,000 mPa·s or less, the workability in forming a coating layer does not deteriorate, and the water sliding property does not deteriorate, either. Note that, herein, a viscosity is represented by a value measured by a measurement method in accordance with JIS Z 8803 (EHD viscometer, 25° C. for 1 minute, a product of Toki Sangyo Co., Ltd.).

A favorable composition amount of the component (D) in the present invention is within a range of 10 to 150 parts by mass, preferably 15 to 120 parts by mass, and furthermore preferably within a range of 20 to 100 parts by mass, relative to 100 parts by mass of the component (A). With the component (D) in these composition amounts or more, there is no water sliding property problem. On the other hand, the component (D) in these composition amounts or less is preferable because the workability will not deteriorate.

Besides, the coating agent composition of the present invention can optionally contain an additive component (s) added thereto as appropriate, as long as the properties of the coating agent composition are not impaired. For example, it is possible to select components such as a non-reactive silicone oil, a reactive silicone oil having a different structure from that of the component (D), an alkoxysilane compound, an adhesion promoter such as a silane coupling agent, an anti-aging agent, an antirust agent, a colorant, a surfactant, a rheology modifier, an ultraviolet absorber, an infrared ray absorber, a fluorescent agent, a polishing agent, a fragrance, and a filler.

The coating agent composition of the present invention is applicable to various substrates such as metals, glasses, ceramics, and resins. The coating agent composition is favorably applied to a metal steel sheet, a painted metal steel sheet, or a glass surface, and particularly favorably utilized in a painted steel sheet used for an automotive exterior (in the present invention, also referred to as a steel sheet of an automotive exterior).

The means for applying the coating agent composition of the present invention is not particularly limited. Any application means can be used as appropriate such as manual application or brushing using fibers impregnated with the composition, and a mechanical application using an automated apparatus. In the present invention, the coating agent composition is particularly preferably applied by the following method. Specifically, the method includes: impregnating fibers such as dry sponge or waste cloth with an appropriate amount of the coating agent composition of the present invention; thinly applying and spreading the composition over the substrate surface by hand; and vaporizing the volatile component by natural drying or forced drying using a dryer or the like. In this event, the hydrolysis reaction of the components (A) and (D), which are reaction components contained in the composition, proceeds by the action of the catalyst (B), and the components (A) and (D) are cross-linked on the substrate simultaneously with the vaporization of the volatile component, or following the vaporization, so that a cured coating film is formed.

A coating layer formed from the coating agent composition of the present invention is constituted of a cured product obtained by reacting the components (A) and (D), which are reaction components contained in the coating agent composition of the present invention, in the presence of the curing catalyst (B). In the cured product, the hydrolyzable silicone resin (A) is cross-linked by the dimethylpolysiloxane (D).

Additionally, the coating layer of the coating agent composition of the present invention is favorably formed into a thin film. The film thickness is preferably within a range of approximately 0.01 to 100 μm, preferably 0.05 to 75 μm, and more preferably 0.1 to 50 μm. The coating layer having a thickness within these ranges makes it possible to achieve all of favorable water repellency, water sliding property, and workability during the coating, as well as the durability and aesthetic appearance at the same time. In the aforementioned natural drying, the composition is left standing at room temperature (25° C.) for, for example, 1 to 30 days, preferably 5 to 20 days, and more preferably 10 to 20 days. Meanwhile, in the forced drying using a dryer or the like, the composition is dried at, for example, 40 to 200° C., preferably 50 to 150° C., more preferably 60 to 120° C., for, for example, 1 to 48 hours, preferably 4 to 24 hours, and more preferably 8 to 12 hours.

The formation mechanism of a coating film having excellent properties of the coating agent composition of the present invention is conceivably as follows. Specifically, cross-linking the component (A) by a condensation reaction on a substrate forms a firm coating film which exhibits water repellency and water sliding property. Further, the component (D) also forms a cross-linked structure by a condensation reaction with the same type of the compound. In this respect, an alkoxysilyl group is present also in the cross-linked coating film of the component (A), and cross-linked with the component (D). This makes the coating film dense and smooth, conceivably leading to the enhancement of the workability such as ease of dry wiping.

Hereinafter, the effects of the present invention will be described in detail by way of Examples. However, these Examples are not intended to limit the aspects of the present invention.

EXAMPLES

The properties of compositions of the present invention for forming a coating film were evaluated and examined in Examples and Comparative Examples by the following methods. Moreover, materials shown in Tables 1 and 2 were used for constituent components contained in the coating agent compositions evaluated as Examples and Comparative Examples of the present invention. Each of the compositions was prepared at mass ratios shown in the tables.

[Evaluation Method for Operability]

Tissue paper was impregnated with approximately 2 ml of one of the compositions of Examples and Comparative Examples shown in Tables 1 and 2. Then, the composition was thinly applied to a black painted sheet (material: SPCC-SD steel sheet, specification: JIS-G-3141, dimensions: 0.8 mm×70 mm×150 mm, after chemical-electrodeposition, one surface was painted in black with an amino alkyd, a product of Asahi-Betechno) by hand. The painted sheet was left standing in a room at 25° C. for 10 minutes. Subsequently, the excessive composition left on the painted sheet was wiped with a dry microfiber cloth. Thus, test pieces were prepared. In this event, if the wiping was performed lightly and uniformly, the composition was rated in the tables as good; if the wiping was performed slightly non-uniformly or the wiping was difficult due to heavy wiping resistance, rated as fair; and if the wiping was performed considerably non-uniformly or the wiping was not performed at all, rated as poor.

[Evaluation Methods for Water Repellency and Water Sliding Property]

Test pieces were prepared to which the compositions were applied by the same method as in the operability evaluation. The test pieces were further left standing in a room at 25° C. for 2 weeks and cured. Thus, test pieces coated with the compositions were obtained (test piece size: 70 mm×150 mm, the film thickness of the composition coating: approximately 0.05 μm). One drop (approximately 0.005 ml) of purified water was dropped to the test piece, and the water contact angle was measured using a contact angle meter (DM-500, a product of Kyowa Interface Science Co., Ltd.) to evaluate the water repellency. A desirable value of the contact angle as the water repellency is approximately 100° or more. Moreover, the same test piece to which one drop (approximately 0.05 ml) of purified water was dropped was gradually tilted from a horizontal state, and an angle at which the water drop started flowing was determined as a water sliding angle to evaluate the water sliding property. A desirable value of the water sliding angle as the water sliding property is approximately 30° or less.

[Evaluation Method for Storage Stability]

The compositions of Examples 2 and 5 shown in Table 1 were measured for the operability, water contact angle, and water sliding angle by the above-described methods and evaluated for the storage stability properties, after 50 g of each of these compositions was put in a 100-ml glass bottle, hermetically sealed, and stored in a constant-temperature drying furnace set at 40° C. for a month.

[Evaluation Method for Wear Resistance]

For the composition of Example 5 shown in Table 1, a test piece was prepared by the same method as in the water repellency and water sliding property evaluation (test piece size: 70 mm×150 mm, the film thickness of the composition coating: approximately 0.05 μm). The surface of the test piece to which the composition was applied was worn using a simple friction tester (a product of Imoto Machinery Co., Ltd.) by placing and stroking a rubbing material 200 times on the surface at a rate of 30 times/minutes with a movement distance of 100 mm and a load of 300 g. After the wearing, the water contact angle and the water sliding angle of the surface were measured by the same methods as above. Here, the rubbing material used in the test is a dry clean cloth (water absorbing cloth made of cellulose/cotton composite fibers, a product "ThreeBond 6644E" of Three Bond Co., Ltd.) 40 mm in width containing a sufficient amount of distilled water and wound around a stainless cylinder 20 mm in diameter. The rubbing material was placed and slid in such a manner that the axis of the cylinder is directed in a direction orthogonal to a sliding direction.

[Preparation of (D) Component]

The components (D) used in Examples and Comparative Examples of the present invention were synthesized according to the following procedures.

Synthesis Example 1 (D-1)

A flask was charged with 100 g of a dimethyl silicone oil (S-1) having a viscosity at 25° C. of 1,000 mPa·s and containing one silanol group at both ends of the molecular chain, to which 4 g of methyltrimethoxysilane was added and stirred for 5 minutes. Then, 0.044 g of dihexylamine as a catalyst and 0.044 g of 2-ethylhexanoic acid were added thereto and stirred at 60° C. for 2 hours for the reaction. The FT-IR measurement confirmed that there was no silanol group. Thus, dimethylpolysiloxane (D-1) having dimethoxysilyl groups at both ends and a viscosity of 1,080 mPa·s was obtained.

Synthesis Example 2 (D-2)

A flask was charged with 100 g of a dimethyl silicone oil (S-2) having a viscosity at 25° C. of 5,100 mPa·s and containing one silanol group at both ends of the molecular chain, to which 4 g of methyltrimethoxysilane was added and stirred for 5 minutes. Then, 0.04 g of dihexylamine as a catalyst and 0.04 g of 2-ethylhexanoic acid were added thereto and stirred at 60° C. for 2 hours for the reaction. The FT-IR measurement confirmed that there was no silanol group. Thus, dimethylpolysiloxane (D-2) having dimethoxysilyl groups at both ends and a viscosity of 6,200 mPa·s was obtained.

Synthesis Example 3 (D-3)

A flask was charged with 100 g of a dimethyl silicone oil (S-4) having a viscosity at 25° C. of 21,300 mPa·s and containing one silanol group at both ends of the molecular chain, to which 4 g of methyltrimethoxysilane was added and stirred for 5 minutes. Then, 0.04 g of dihexylamine as a catalyst and 0.04 g of 2-ethylhexanoic acid were added thereto and stirred at 60° C. for 2 hours for the reaction. The FT-IR measurement confirmed that there was no silanol group. Thus, dimethylpolysiloxane (D-3) having dimethoxysilyl groups at both ends and a viscosity of 26,300 mPa·s was obtained.

The coating agent compositions used as Examples and Comparative Examples of the present invention were each prepared by: stirring the component (C) at normal temperature (25° C.), sequentially introducing the component (A) and the component (D) or a comparative component (D') thereto, then introducing the component (B) thereto, and continuously stirring the mixture for approximately 10 minutes.

The raw materials contained in the compositions prepared as Examples and Comparative Examples in the following tables were as follows.

(A) Hydrolyzable Silicone Resin

KS-89S: a partial hydrolysis condensate of 2 to 4 molecules of the structural formula (1), where $R^1$ and $R^2$ were both methyl groups, and x=1; the compound had a viscosity at 25° C. of 5 mPa·s; a product of Shin-Etsu Chemical Co., Ltd.

KR-500: a partial hydrolysis condensate of 6 to 10 molecules of the structural formula (1), where $R^1$ and $R^2$ were both methyl groups, and x=1; the compound had a viscosity at 25° C. of 25 mPa·s; a product of Shin-Etsu Chemical Co., Ltd.

X-40-9225: a partial hydrolysis condensate of 10 to 20 molecules of the structural formula (1), where $R^1$ and $R^2$ were both methyl groups, and x=1; the compound had a viscosity at 25° C. of 80 mPa·s; a product of Shin-Etsu Chemical Co., Ltd.

(B) Curing Catalyst

D25: titanium alkoxide catalyst; a product of Shin-Etsu Chemical Co., Ltd.

DX9740: organoaluminum catalyst; a product of Shin-Etsu Chemical Co., Ltd.

(C) Organic Solvent

Exxsol D30: de-aromatized naphthene-based hydrocarbon mixed solvent; initial boiling point of 145° C.; a product of Tonen General Sekiyu K.K.

n-Butyl Alcohol: Reagent (D) Dimethylpolysiloxane having one or more alkoxysilyl groups at both ends of the molecular chain, and comparative components thereof D-1: the compound synthesized in Synthesis Example 1; in the structural formula (2), $R^3$ to $R^8$ were all methyl groups, a=b=2, and m=300 to 400

D-2: the compound synthesized in Synthesis Example 2; in the structural formula (2), $R^3$ to $R^8$ were all methyl groups, a=b=2, and m=640 to 740

D-3: the compound synthesized in Synthesis Example 3; in the structural formula (2), $R^3$ to $R^8$ were all methyl groups, a=b=2, and m=1000 to 1200

S-1: a compound represented by the following structural formula, where m=300 to 400, and having a viscosity at 25° C. of 1,000 mPa·s

S-2: a compound represented by the following structural formula, where m=640 to 740, and having a viscosity at 25° C. of 5,100 mPa·s

KF9701: a compound represented by the following structural formula, where m=approximately 40, and having a viscosity at 25° C. of approximately 40 mPa·s (a product of Shin-Etsu Chemical Co., Ltd.)

KF6003: a compound represented by a general formula of $HO(CH_2)_2O(CH_2)_3$—$(Si(CH_3)_2O)_m$—$(CH_2)_3O(CH_2)_2OH$, where m approximately 70 to 75, and having a viscosity at 25° C. of approximately 100 mPa·s (a product of Shin-Etsu Chemical Co., Ltd.)

X-22-170DX: a compound represented by a general formula of $HO(CH_2)_2O(CH_2)_3$—$(Si(CH_3)_2O)_m$—$Si(CH_3)_3$, where m approximately 75 to 85, and having a kinetic viscosity at 25° C. of 75 mm²/s (a product of Shin-Etsu Chemical Co., Ltd.)

X-24-9011: polydimethylsiloxane having modified trimethoxy at one end thereof; the compound had a kinetic viscosity at 25° C. of 20 mm²/s (a product of Shin-Etsu Chemical Co., Ltd.)

S-3: a compound represented by the following structural formula (2), where m=2 to 5, and having a viscosity at 25° C. of 10 mPa·s

S-4: a compound represented by the following structural formula, m=1,000 to 1,200, and having a viscosity at 25° C. of 21,300 mPa·s

KBM7103: trifluoropropyltrimethoxysilane (a product of Shin-Etsu Chemical Co., Ltd.)

KBM3103: n-decyltrimethoxysilane (a product of Shin-Etsu Chemical Co., Ltd.)

KBM13: methyltrimethoxysilane (a product of Shin-Etsu Chemical Co., Ltd.)

TABLE 1

| raw material | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| (A) | KC-895 | | | | | 0.4 | | | | | 0.2 | 0.4 | | 0.4 |
| | KR-500 | 0.4 | 0.4 | 0.4 | 0.4 | | 0.4 | | | 0.2 | | 0.4 | | |
| | X-40-9225 | | | | | | | 0.4 | 0.4 | | | | 0.4 | |
| (B) | D25 | 0.02 | 0.02 | 0.02 | 0.02 | 0.03 | | 0.02 | | 0.02 | | | | |
| | DX9740 | | | | | | 0.1 | | 0.065 | | 0.075 | 0.075 | 0.075 | 0.075 |
| (C) | Exxsol D30 | 10 | 10 | 10 | 10 | 11 | 10 | 10 | 8 | 8 | 8 | 8 | 8 | 8 |
| | n-butyl alcohol | | | | | 1 | | | | | | | | |
| (D) | D-1 | | | | | | | | | | 0.15 | 0.15 | 0.15 | |
| | D-2 | 0.08 | 0.1 | 0.2 | 0.4 | 0.15 | 0.2 | 0.2 | 0.15 | 0.15 | | | | |
| | D-3 | | | | | | | | | | | | | 0.15 |
| total | | 10.1 | 10.1 | 10.2 | 10.4 | 12.2 | 10.3 | 10.2 | 8.2 | 8.2 | 8.2 | 8.2 | 8.2 | 8.2 |
| Properties evaluated | operability | good | good | good | good | good | good | good | good | good | good | good | good | good |
| | water contact angle (°) | 107 | 107 | 105 | 105 | 108 | 106 | 108 | 106 | 103 | 104 | 104 | 105 | 105 |
| | water sliding angle (°) | 30 | 27 | 24 | 25 | 25 | 29 | 27 | 26 | 27 | 24 | 25 | 26 | 27 |

Note)
the units of the contents of the components (A) to (D) and total contents thereof are all "parts by mass."

TABLE 2

| raw material | | | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|---|
| (A) | KR-500 | | 0.4 | 0.4 | 0.4 | 0.4 | 0.4 | 0.4 | 0.4 | 0.4 | 0.4 |
| (B) | D25 | | 0.02 | 0.01 | 0.01 | 0.04 | 0.04 | 0.04 | 0.02 | 0.02 | 0.02 |
| (C) | Exxsol D30 | | 10 | 10 | 10 | 10 | 10 | 10 | 10 | 10 | 10 |
| (D) | D-2 | | | | | | | | | | |
| (D') | S-1 | | | | | | | | | | |
| | S-2 | | | | | | | | | | |
| | KF9701 | | | | | | | | | | |
| | KF6003 | | | | | | 0.09 | | | | |
| | X-22-1700X | | | | | | | 0.1 | | | |
| | X-24-9011 | | | | | | | | 0.09 | | |
| | S-3 | | | | | | | | | 0.1 | 0.2 | 0.4 |
| | KBM7103 | | | 0.08 | | | | | | | |
| | KBM3103 | | | | 0.08 | | | | | | |
| | KBM13 | | | | | | | | | | |
| total | | | 10.4 | 10.5 | 10.5 | 10.5 | 10.5 | 10.5 | 10.5 | 10.6 | 10.8 |
| Properties evaluated | operability | | fair | fair | fair | fair | fair | fair | good | good | good |
| | water contact angle (°) | | 78 | 75 | 77 | 97 | 95 | 97 | 94 | 94 | 94 |
| | water sliding angle (°) | | 40 | 39 | 43 | 35 | 37 | 22 | 22 | 23 | 22 |

| | | raw material | Com. Ex. 10 | Com. Ex. 11 | Com. Ex. 12 | Com. Ex. 13 | Com. Ex. 14 | Com. Ex. 15 | Com. Ex. 16 |
|---|---|---|---|---|---|---|---|---|---|
| | (A) | KR-500 | 0.4 | 0.4 | 0.4 | 0.4 | 0.4 | 0.4 | 0.4 |
| | (B) | D25 | 0.02 | 0.02 | 0.01 | 0.02 | 0.02 | 0.02 | 0.02 |
| | (C) | Exxsol D30 | 5 | 10 | 10 | 10 | 10 | 10 | 10 |
| | (D) | D-2 | | | | | | | 0.03 |
| | (D') | S-1 | | 0.08 | | | | | |
| | | S-2 | | | 0.08 | 0.1 | 0.1 | 0.2 | |
| | | KF9701 | 0.2 | | | | | | |
| | | KF6003 | | | | | | | |
| | | X-22-1700X | | | | | | | |
| | | X-24-9011 | | | | | | | |
| | | S-3 | | | | | | | |
| | | KBM7103 | | | | | | | |
| | | KBM3103 | | | | | | | |
| | | KBM13 | | | | | 0.05 | | |
| | total | | 5.6 | 10.5 | 10.5 | 10.5 | 10.6 | 10.6 | 10.4 |
| | Properties evaluated | operability | fair | fair | fair | fair | fair | fair | good |
| | | water contact angle (°) | 100 | 103 | 106 | 103 | 103 | 106 | 100 |
| | | water sliding angle (°) | 37 | 33 | 35 | 31 | 31 | 27 | 38 |

Note)
the units of the contents of the components (A) to (D) and (D') and total contents thereof are all "parts by mass."

The results in Table 1 verified that each of the compositions of the present invention containing the constitutions (A) to (D) at predetermined composition ratios had favorable operability, and both of the water repellency and the water sliding property thereof also satisfied predetermined properties. In Examples 1 to 4 in which the composition amounts of the component (D) were changed within a predetermined range, all the properties were favorable.

On the other hand, the results in Table 2 verified that Comparative Example 1 containing no component (D) had a low operability, and both of the water repellency and the water sliding property were insufficient. Meanwhile, among compositions using the component (D) but not satisfying the predetermined chemical structure, Comparative Examples 2 and 3 substituting with low-molecular-weight silane compounds had insufficient operability, water repellency, and water sliding property. In Comparative Examples 4 and 5 each substituting with the component (D) of polydimethylsiloxane having carbinol at one end or both ends of the molecular chain also, all the properties were insufficient as in the case of Comparative Examples 2 and 3. In Comparative Example 6 having a terminal alkoxysilyl only at one end, the water sliding property was favorable, but the other properties were insufficient. In Comparative Examples 7 to 9 each substituting with the component (D) having alkoxysilyl groups at both ends but having a viscosity not satisfying a predetermined value, the operability and the water sliding property were favorable, but the water repellency was insufficient. Comparative Examples 10 to 15 each substituting with the component (D) having silanols at both ends of the molecular chain included ones whose viscosity was within a predetermined range (Comparative Examples 11 to 15) and not within the predetermined range (Comparative Example 10). The water repellency of all of Comparative Examples 10 to 15 satisfied a predetermined performance, but the operability was insufficient. None but Example 15 satisfies the predetermined water sliding properties. Comparative Example 16 in which the composition amount of the component (D) was less than the predetermined range was verified that the operability and the water repellency satisfied predetermined performances, but the water sliding property was insufficient.

After the wear resistance test was conducted, the composition of Example 5 had a water contact angle of 105° and a water sliding angle of 26° (not shown in the table), and thus exhibited a water repellency and a water sliding property as high as those before the test. This verified that the composition of the present invention is capable of forming a thin coating layer excellent in wear resistance. Moreover, from both the compositions of Examples 2 and 5 after the storage stability evaluation was conducted (not shown in the table), results equivalent to those in the states before the storage were obtained. This verified that the composition of the present invention has a favorable storage stability and is storable for a long period.

INDUSTRIAL APPLICABILITY

The coating agent composition of the present invention has excellent water repellency and water sliding property, as well as favorable application workability, wear resistance, and storage stability. The coating agent composition is particularly useful and favorably usable in forming a thin coating layer for imparting water repellency, water sliding property, gloss, durability, and antifouling properties to a metal surface, a painted surface, or a resin surface of automotive bodies and railroad vehicles, and other similar objects.

The invention claimed is:

1. A coating agent composition comprising the following components (A) to (D):
    (A) 100 parts by mass of a hydrolyzable silicone resin;
    (B) 0.1 to 50 parts by mass of a curing catalyst;
    (C) 100 to 5000 parts by mass of an organic solvent; and
    (D) 10 to 150 parts by mass of dimethylpolysiloxane having one or more alkoxysilyl groups at both ends of the molecular chain, wherein (D) has a viscosity at 25° C. of 100 to 100,000 mPa·s, and
    wherein the component (A) is a partial hydrolysis condensate of an alkoxysilane compound represented by the following structural formula (1):

$$R^1{}_x-Si(OR^2)_{4-x} \quad (1),$$

where $R^1$ and $R^2$ are each independently an optionally substituted aliphatic, alicyclic, or aromatic hydrocarbon group,
    x is an integer of 0 to 3, and
    a substituent of the aliphatic, alicyclic, or aromatic hydrocarbon group is a halogen, a hydroxyl group, an amino group, an imino group, a nitro group, a mercapto group, a vinyl group, or a carboxyl group.

2. The coating agent composition according to claim 1, wherein
    the $R^1$ and the $R^2$ are each independently an optionally substituted the aliphatic, the alicyclic, or the aromatic hydrocarbon group having 1 to 8 carbon atoms.

3. The coating agent composition according to claim 2, wherein the x in the structural formula (1) of the component (A) is 0 or 1.

4. The coating agent composition according to claim 2, wherein, in the structural formula (1) of the component (A), the $R^1$ and the $R^2$ are methyl, and the x is 1.

5. The coating agent composition according to claim 1, wherein the component (D) is represented by the following structural formula (2):

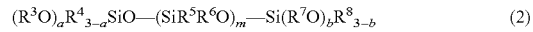
$$(R^3O)_a R^4{}_{3-a}SiO-(SiR^5R^6O)_m-Si(R^7O)_b R^8{}_{3-b} \quad (2)$$

wherein
    $R^3$ and $R^7$ are each independently an alkyl group having 1 to 3 carbon atoms,
    $R^4$ and $R^8$ are each independently a functional group selected from an alkyl group having 1 to 6 carbon atoms, a haloalkyl group having 1 to 6 carbon atoms, and an allyl group having 1 to 6 carbon atoms,
    $R^5$ and $R^6$ are each independently an optionally substituted alkyl group having 1 to 4 carbon atoms or an optionally substituted phenyl group,
    a and b each independently represent an integer of 1 to 3, and
    m represents an integer of 10 to 1500.

6. The coating agent composition according to claim 5, wherein, in the component (D) represented by the structural formula (2),
    the a and the b are each independently 2 or 3, and
    the $R^3$ and the $R^7$ are both methyl groups.

7. The coating agent composition according to claim 5, wherein, in the component (D) represented by the structural formula (2),
    the a and the b are 2, and
    the $R^3$ to the $R^8$ are all methyl groups.

8. The coating agent composition according to claim 1, wherein the coating agent composition is applied to a steel sheet of an automotive exterior.

9. A method for forming a coating layer, comprising:
    applying the coating agent composition according to claim 1 to a substrate surface; and
    while vaporizing the organic solvent (C), cross-linking reaction components including the components (A) and (D) on the substrate to form a cured coating film.

10. The method according to claim 9, wherein
    the $R^1$ and the $R^2$ are each independently an optionally substituted the aliphatic, the alicyclic, or the aromatic hydrocarbon group having 1 to 8 carbon atoms.

11. The method according to claim 10, wherein the x in the structural formula (1) of the component (A) is 0 or 1.

12. The method according to claim 9, wherein the component (D) is represented by the following structural formula (2):

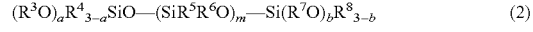
$$(R^3O)_a R^4{}_{3-a}SiO-(SiR^5R^6O)_m-Si(R^7O)_b R^8{}_{3-b} \quad (2)$$

wherein
    $R^3$ and $R^7$ are each independently an alkyl group having 1 to 3 carbon atoms,
    $R^4$ and $R^8$ are each independently a functional group selected from an alkyl group having 1 to 6 carbon atoms, a haloalkyl group having 1 to 6 carbon atoms, and an allyl group having 1 to 6 carbon atoms,
    $R^5$ and $R^6$ are each independently an optionally substituted alkyl group having 1 to 4 carbon atoms or an optionally substituted phenyl group,
    a and b each independently represent an integer of 1 to 3, and
    m represents an integer of 10 to 1500.

13. The method according to claim 12, wherein, in the component (D) represented by the structural formula (2),
    the a and the b are each independently 2 or 3, and
    the $R^3$ and the $R^7$ are both methyl groups.

14. A coating layer formed by the method for forming a coating layer according to claim 9.

15. A coating layer formed from curing the coating agent composition according to claim 1.

16. The coating layer according to claim 14 which is on a steel sheet of an automotive exterior.

17. The coating layer according to claim 14, wherein a cured film thickness of the coating layer is 0.01 to 100 μm.

* * * * *